April 2, 1968     E. P. BROWNING     3,375,733
COMBINED VARIABLE SPEED AND PLANETARY DRIVE
Filed Jan. 10, 1966
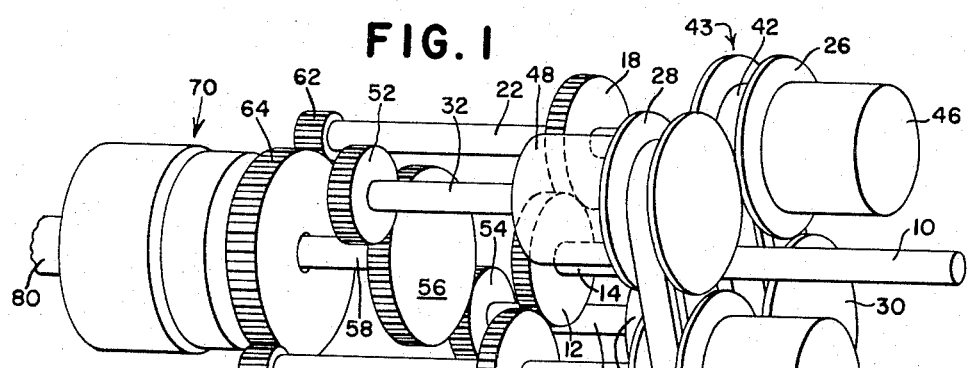
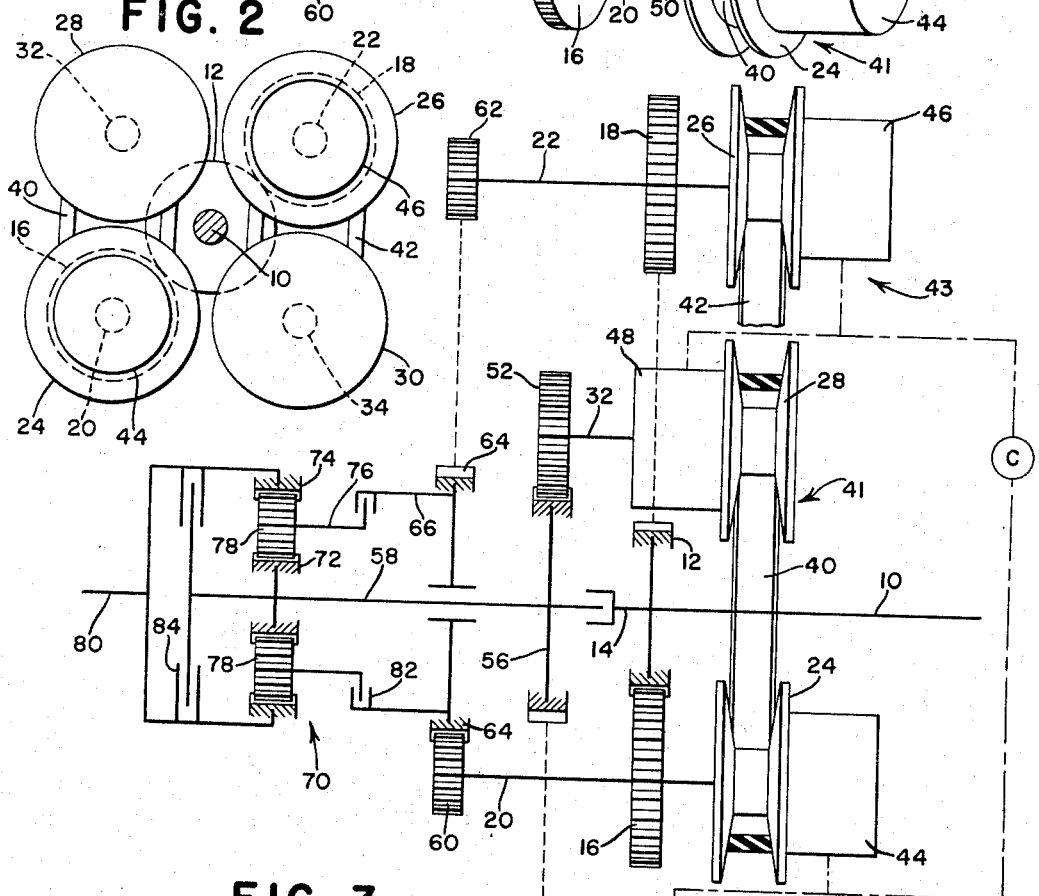
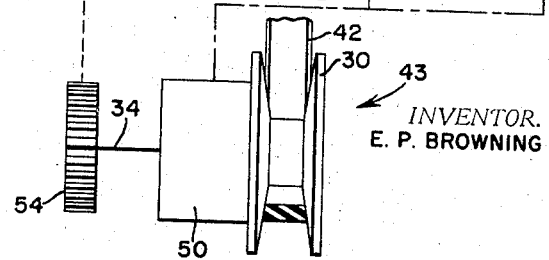
*INVENTOR.*
E. P. BROWNING United States Patent Office 3,375,733
Patented Apr. 2, 1968

3,375,733
COMBINED VARIABLE SPEED AND
PLANETARY DRIVE
Edgar P. Browning, Cedar Falls, Iowa, assignor to Deere & Company, Moline, Ill., a corporation of Delaware
Filed Jan. 10, 1966, Ser. No. 519,564
8 Claims. (Cl. 74—689)

ABSTRACT OF THE DISCLOSURE

A transmission having a constant speed input shaft driving a pair of infinitely variable belt drives where the variable diameter drive and driven sheaves of one set are respectively diametrically opposite the drive and driven sheaves of the other set relative to the input shaft axis and the driven sheaves drive the sun gear of a planetary gear train coaxial with the input shaft, the carrier being connectible to the input shaft for a dual input drive range and the ring gear being connectible to a sun gear for a direct drive range.

This invention relates to a vehicle transmission and more particularly to an improved infinitely variable speed drive combined with a planetary drive for agricultural vehicles, such as tractors or the like.

Although it is known to combine an infinitely variable drive with a planetary drive in an agricultural vehicle to provide an infinitely variable transmission with a wide variety of speeds, previous transmissions of this type have utilized a single belt or endless drive element connecting inversely variable drive and driven sheaves, the drive and driven sheaves being connected to a three-element planetary drive whereby the speed of two of the elements is controlled to produce a wide variety of speeds in the third or output element. However, when such transmissions are utilized in agricultural tractors or the like, it is necessary that they transmit relatively large torques, especially in larger, more powerful tractors, and it has been found that a variable speed drive having only one endless drive element is not satisfactory for some tractors. Nor is the problem solved by doubling, tripling etc. the belt or chain in conjunction with axially spaced sheaves, since the overall length of the transmission becomes excessive.

The primary object of the present invention is to provide an improved transmission of the type described above, utilizing an infinitely variable drive having a plurality of endless drive elements, and further to provide such a transmission having an efficient, compact, and balanced arrangement of components, and which is substantially the same size and length as a similar single drive element transmission. A more specific object is to provide such a transmission with the endless drive elements moving in substantially the same plane. Still another object is to provide such a transmission with a dual drive element infinitely-variable drive having two drive and two driven sheaves axially parallel and offset from the transmission input, with the drive and driven sheaves of one drive being respectively diametrically opposite the drive and driven sheaves of the second drive relative to the input axis.

These and other objects will become apparent from the following detailed description and accompanying drawings wherein:

FIG. 1 is a perspective view showing the arrangement of the components in the transmission.

FIG. 2 is an elevation view of the transmission as viewed from the input end of the transmission (from the right in FIG. 1).

FIG. 3 is a schematic view of the transmission.

The power source for the transmission includes a shaft 10, which, in a conventional agricultural tractor, extends rearwardly from and is driven by an internal combustion engine (not shown), which is generally governed to operate at a constant speed. The above orientation is established for the purpose of clarity only, and it is to be understood that such words as "fore-and-aft," "upwardly," "downwardly," "forwardly," or "rearwardly" are not to be construed as limiting the invention. Moreover, the transmission could be used in other vehicles, such as combines or the like.

A spur gear 12 is coaxially affixed to the rear end 14 of the power source shaft 10 and meshes with a pair of identical spur gears 16 and 18 respectively fixed on fore-and-aft counter shafts 20 and 22, which are parallel and diametrically opposed relative to the shaft 10. Thus the shafts 20 and 22 are driven in the same direction and at a speed that remains constant so long as engine speed is constant.

A pair of identical variable-diameter drive sheaves 24 and 26 are respectively mounted on and rotated by the constant-speed shafts 20 and 22 coaxially ahead of the gears 16 and 18, and a pair of identical variable-diameter driven sheaves 28 and 30 are coaxially affixed to a pair of driven sheave shafts 32 and 34 respectively, the shafts 32 and 34 also being parallel and diametrally opposite relative to the shaft 10. The sheaves all lie in a plane transverse to the shaft 10, and an endless driving element 40 drivingly interconnects the sheaves 24 and 28 to form a first variable-speed drive means 41, while a second endless belt or driving element 42 drivingly interconnects the sheaves 26 and 30 to form a second variable-speed drive means 43. The variable diameters of the drive sheaves 24 and 26 are equally established by coaxially associated and coordinated control cylinders 44 and 46, respectively, of conventional construction and in operating to axially shift one sheave face relative to the other, and the diameters of the driven sheaves 28 and 30 are similarly established by coaxially associated and coordinated control cylinders 48 and 50 respectively, whereby the driven sheave shafts 32 and 34 are drivable at the same speed, which is variable relative to the normally constant speed of the positive drive shafts 20 and 22. The control cylinders of the two sheave sets or variable-speed means 41 and 43 are of course interconnected so that the same speed changes are impressed upon both sets simultaneously. Since this may be achieved in a variety of ways, only a schematic illustration has been resorted to here, using the encircled "C" as the main control and the dot-dash lines extending therefrom to the sheave cylinders 44 and 46 as representative of mechanical linkages, hydraulic lines, etc.

Identical spur gears 52 and 54 are fixed to the driven sheave shafts 32 and 34 respectively and diametrally oppositely mesh with and drive a variable-speed input member, here a spur gear 56 that is coaxially affixed to a variable-speed input shaft 58 coaxially rearwardly of and journaled relative to the constant-speed shaft 10. A pair of identical spur gears 60 and 62, fixed respectively to the constant-speed drive shafts 20 and 22 rearwardly of the gears 16 and 18, mesh with a spur gear 64 that is coaxially fixed to a constant-speed input member 66 journaled on the variable-speed drive shaft 58.

A typical planetary transmission 70, coaxial with and spaced rearwardly from the constant-speed input member 66, includes a sun gear element 72, a ring gear element 74, a carrier element 76, and a plurality of planetary pinions 78. The shaft and gear sets 12–16–20–60 and 12–18–22–62 comprise two separate but identical constant-speed drive means between the power shaft 10 and the constant-speed input member 64. The sun gear 72 is fixed to the variable-speed drive shaft 58, the ring gear 74 is coaxially affixed to a rearwardly extending output member 80, which may be connected in any known manner to vehicle traction wheels (not shown), and the carrier 76 is selectively connectible to and disconnectible from the constant-speed input member 66 via a reduction range clutch means 82. The output member 80 is selectively connectible to and disconnectible from the variable-speed drive shaft 58 via a direct range clutch means 84.

In operation, when the reduction range clutch means 82 is engaged and the direct range clutch is disengaged, the carrier 76 is clutched-connected to and driven at a constant speed by the input member 66, the speed of which is determined by the engine shaft 10 via the gear 12, gears 16 and 18, shafts 20 and 22, and gears 60 and 62. The speed of the sun gear 72 is variable through its connection to the variable speed means 41–43 via the variable speed shaft 58, gear 56, gears 52 and 54, and shafts 32 and 34. Rotation of the carrier 76 at a constant speed while the speed of the sun gear 72 is varied produces changes in the speed of the ring gear 74 and its coaxially connected output member 80. A second range of variable output speeds may be achieved by disconnecting the reduction range clutch means 82 and engaging the direct range clutch means 84, whereby the output member 80 is directly connected to and driven by the variable speed drive shaft 58; that is, no reduction is achieved in the planetary train 70. Thus the two clutch means together comprise coupling means selectively operative in two conditions to increase the overall range of speeds available from the variable-speed means 41–43.

It is not the intention to limit the invention to the above-described planetary transmission 70, and numerous other arrangements for interconnecting the planetary elements, the constant speed input member 66, the variable speed shaft 58, and the output member 80 may be devised for achieving a multi-range infinitely-variable output speed.

The invention features, broadly, the spatial separation of the two constant-speed drive means 16–20–60 and 18–22–62 so that two parallel and identical constant-speed power paths are established between the engine shaft 10 and the planetary carrier input 64, plus the spatial separation of the two variable-speed means 41 and 43 to provide two parallel and identical variable-speed paths from the engine shaft 10 to the planetary sun input 56.

By locating the drive sheaves 24 and 26 and the positive drive shafts 20 and 22 diametrally opposite relative to the shaft 10 and the planetary axis, and by similarly locating the driven sheaves 28 and 30 and the shafts 32 and 34 diametrally opposite relative to the shaft 10 and the planetary axis, a compact and balanced arrangement of components is achieved which also eliminates excessive bearing loads on the various shafts. In a preferred arrangement, the two diameters on which the axes of the shafts 20, 22, 32 and 34 lie intersect each other at 90°. Moreover, since two variable-speed drive means 41 and 43 are utilized, the torque capacity of the variable-speed drive portion of the transmission is substantially increased over a transmission utilizing only a single variable-speed drive means. Since the variable-speed drive means 41 and 43 are located in the same plane, the overall length of the transmission is no greater than the length of a corresponding transmission utilizing only a single variable-speed drive.

Other features and advantages of the invention will readily occur to those skilled in the art, as will many modifications and alterations in the preferred embodiment described herein, all of which may be achieved without departing from the spirit and the scope of the invention.

What is claimed is:

1. A transmission including a power source, a planetary gear train having relatively rotatable elements of which a first element serves as an output and second and third elements serve as inputs, first drive means for driving the second element from the power source, variable-speed second drive means for driving the third element from the power source, and coupling means selectively operative to effect driving of the output at variable speeds through a planetary reduction range and a direct-drive range, characterized in that the variable-speed drive means includes a pair of coordinated variable-speed sheave sets, providing a dual-path variable-speed input, each set having a drive sheave driven by the power source, a driven sheave driving the aforesaid third element and an endless flexible drive member trained about said drive and driven sheaves, said sheave sets being offset laterally relative to each other as respects the axis of rotation of said third element and arranged so that said endless drive elements are substantially in the same plane transverse to said axis and the driven sheaves are diametrally opposed as respects the axis of the third planetary element so that the two paths of the variable-speed input provide a substantially balanced couple about the axis of the third planetary element.

2. The invention defined in claim 1, further characterized in that: the planetary second and third elements and the power source are coaxial, each of said elements includes a gear coaxially rotatable therewith, the power source includes a gear rotatable therewith, each sheave set includes a shaft coaxially fixed to its drive sheave and parallel to the axis of said elements and power source, each shaft includes first and second gears coaxially fixed thereto and meshing respectively with the power source gear and the second element gear, and each sheave set includes a further gear coaxially fixed to its driven sheave and meshing with said third element gear.

3. The invention defined in claim 2, further characterized in that: the sheave set shafts are disposed at opposite sides of the axis of said elements and power source and lie on a common diameter through said axis and the axes of the driven sheaves are disposed at opposite sides of said axis and lie on a second common diameter through said axis.

4. The invention defined in claim 3, further characterized in that: the shafts, sheaves and gears are so arranged that the aforesaid diameters intersect each other at substantially 90°.

5. The invention defined in claim 1, further characterized in that: the first drive means includes a pair of separate similar constant-speed drive trains from the power source to the second element.

6. The invention defined in claim 1, further characterized in that: the sheaves rotate respectively on four axes parallel to the third element axis.

7. The invention defined in claim 1 wherein the driven sheaves drive the third planetary element through a gear coaxially fixed to the third planetary element and a pair of gears respectively connected to the driven sheaves and meshing with said first-mentioned gear in a diametrally opposite relationship relative to the axis of said gear.

8. The invention defined in claim 7 wherein the power source includes a rotatable shaft and a gear coaxially affixed thereto, and the drive sheaves of each sheave set are respectively connected to and driven by the power source through a pair of gears respectively coaxially connected to and rotatable with the respective drive sheaves and meshing with said power source gear in a diametrally opposite relationship relative to the axis of said power source gear.

References Cited

UNITED STATES PATENTS

| 2,881,624 | 4/1959 | Cardona | 74—230.17 |
| 2,933,952 | 4/1960 | Schou | 74—689 |
| 3,251,243 | 5/1966 | Kress | 74—689 |

FOREIGN PATENTS 1,185,883  1/1965  Germany.

DONLEY J. STOCKING, *Primary Examiner.*

T. R. HAMPSHIRE, *Assistant Examiner.*